(No Model.) 2 Sheets—Sheet 1.

F. R. SIMMS.
PNEUMATIC TIRE.

No. 605,021. Patented May 31, 1898.

Witnesses:
J. D. Kingsbury
B. W. Brockett

Inventor:
Frederick R. Simms
By Whitaker & Prevost
Attys (No Model.) 2 Sheets—Sheet 2.
F. R. SIMMS.
PNEUMATIC TIRE.
No. 605,021. Patented May 31, 1898.
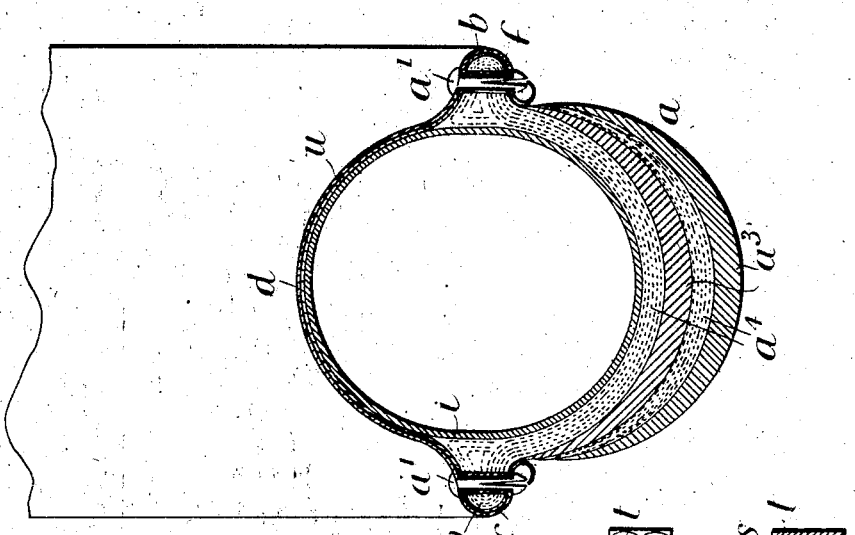
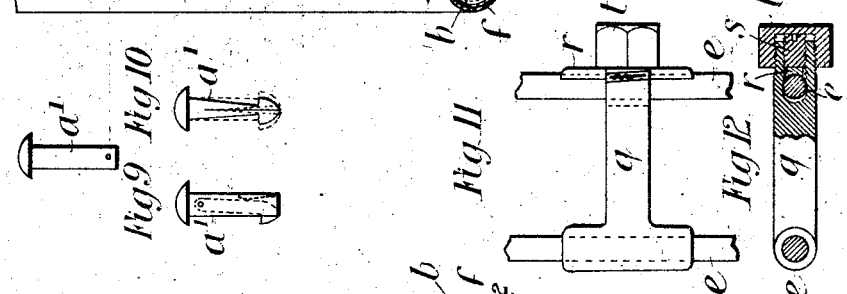
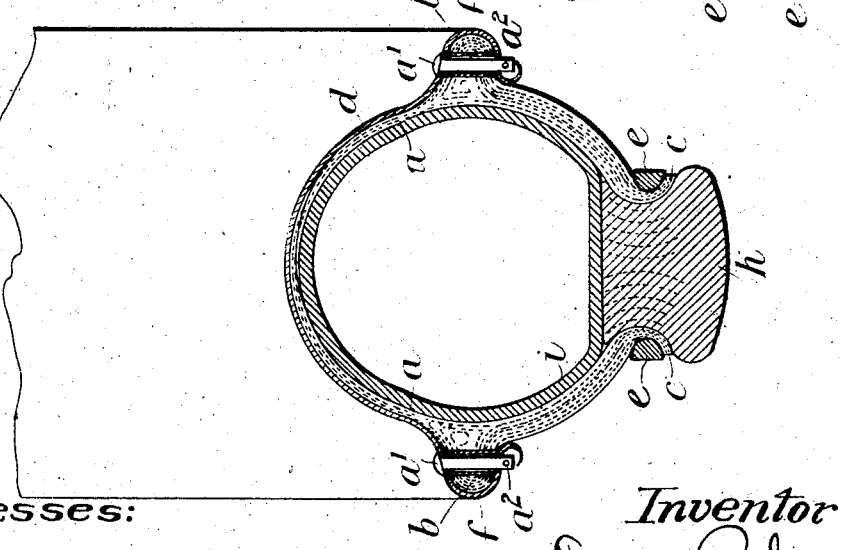
Witnesses:
J. D. Kingsbury
B. W. Brockett
Inventor:
Frederick R. Simms
By Whitaker & Prevost
attys.

UNITED STATES PATENT OFFICE.

FREDERICK RICHARD SIMMS, OF LONDON, ENGLAND.

PNEUMATIC TIRE.

SPECIFICATION forming part of Letters Patent No. 605,021, dated May 31, 1898.

Application filed June 1, 1897. Serial No. 639,021. (No model.) Patented in England July 22, 1896, No. 16,261, and in France December 26, 1896, No. 262,573.

*To all whom it may concern:*

Be it known that I, FREDERICK RICHARD SIMMS, a subject of the Queen of Great Britain, residing at London, England, have invented new and useful Improvements in Pneumatic Tires, (for part of which I have obtained a patent in Great Britain, No. 16,261, dated July 22, 1896, and in France, No. 262,573, dated December 26, 1896,) of which the following is a specification.

This invention relates to improvements in the construction of pneumatic tires for the wheels of cycles, motor-cars, or other vehicles, and has for its object to provide a pneumatic tire which is less liable to puncture and which can support greater pressure than such tires as heretofore generally made.

According to my invention I form the tire of two rings of india-rubber, canvas, or any other suitable flexible material molded to a semicircular shape in cross-section and having a flange on their inner and outer edges, or I may form the said tire or air-cushion of a ring of similar material molded to a horseshoe shape in cross-section and having lateral flanges. The inner flanges of the india-rubber or other rings are designed to be riveted or bolted or otherwise secured to a circular casing of metal or other suitable material and adapted to receive the ends of the spokes or arms of the wheel or to be secured to the wheel, while the outer flanges of the india-rubber rings are similarly secured in an outer casing or rings of metal or other suitable material which forms or form the tread or to which the tread of solid rubber or other suitable material is also secured. The air-cushion may or may not be provided with a separate inner or air tube.

Figure 2:
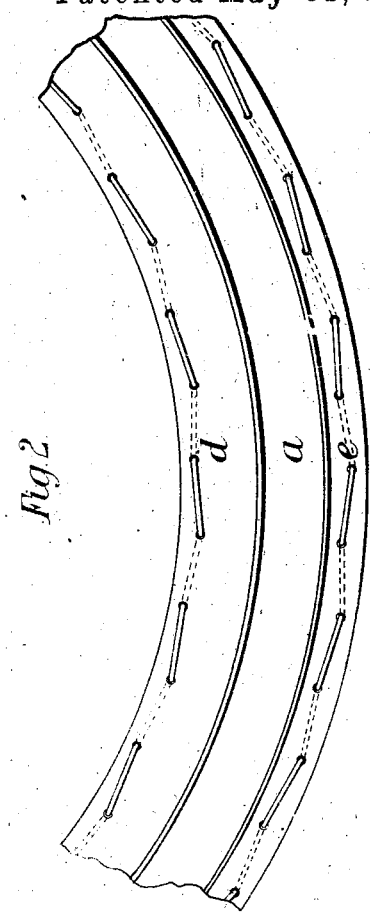
Figure 1:
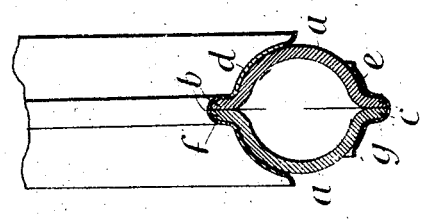

In the accompanying drawings, Figure 1 is a section through the rim of a vehicle-wheel made according to my invention. Fig. 2 is an elevation of a portion of the same. Figs. 3, 4, 5, and 6 are sections similar to Fig. 1 through the rims of modified forms of wheels made according to my invention. Fig. 7 is a section, drawn to a larger scale, of a tire similar to that shown in Fig. 4. Figs. 8, 9, 10, 11, and 12 are views of details. Fig. 13 is a section, drawn to a larger scale, of a modified construction of tire.

Referring to Figs. 1, 2, 3, 4, 5, 6, and 7, $a$ $a$ are the rings, of india-rubber, canvas, or other suitable flexible material, which form the air-cushions, and $b$ $b$ $c$ $c$ are the inner and outer flanges, respectively, provided on the said rings $a$ $a$. $d$ is the inner casing, to which the rings $a$ $a$ are secured and which in the case of the vehicle-wheels forms the rim of the wheel, and $e$ is the outer casing, to which the outer flanges $c$ $c$ of the rings $a$ $a$ and the tread, in cases where a separate tread is employed, are secured.

In the wheel tire and rim shown in Figs. 1 and 2 the india-rubber or other rings $a$ $a$ are secured by their flanges $b$ $b$ to the inner metal casing $d$, which is provided with a deep central groove $f$ to receive them and forms the rim of the wheel, and by their outer flanges $c$ $c$ to the outer metal casing $e$, which is also provided with a deep central groove $g$ to receive them and forms the tread of the wheel, the flanges in both cases being shown secured to the casings by lacing, although it will be obvious that screws, bolts, rivets, or other fastening devices can be equally well employed.

Figure 3:

In the arrangement shown in Fig. 3 the inner flanges $b$ $b$ are arranged laterally, so that the metal rim or inner casing $d$ is formed with two lateral grooves $f$ $f$ instead of the one central groove, as in the above-described construction. The rings $a$ $a$ are continued beyond the lateral flanges $b$ $b$ and overlap at their inner ends. The outer casing, instead of being made of a single grooved ring, is formed of two rings $e$ $e$, of metal or other suitable material, between which the outer flanges $c$ $c$ are secured, and the lower or outer ends $e'$ $e'$ of which are bent back to form a support for a separate flat tread $h$, fixed to it by any suitable means. This tire is shown provided with a separate inner or air tube $i$.

Figure 4:
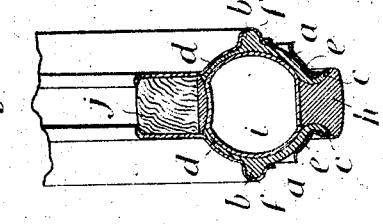

Fig. 4 illustrates the application of the tire to a wheel having an ordinary wood in rim $j$. In this case the construction is very similar to that just described; but the inner casing $d$ is made in two parts, which are extended inwardly, so as to be firmly secured to the rim $j$, and the separate tread $h$ is not secured to a metal support, but is gripped between the outer flanges $c$ $c$ by the two rings $e$ $e$, forming the outer casing.

Figure 5:
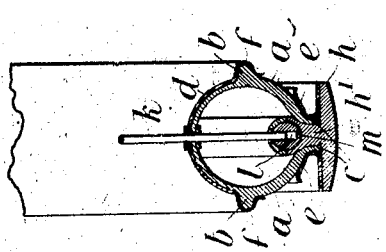

In the arrangement shown in Fig. 5, the construction of which is very similar to that shown in Fig. 3, with the exception that no inner or air tube $i$ is employed, the spokes $k$ of the wheel extend through the rim $d$ into the tire and enter holes $l$ in balls $m$, supported in recesses or cups in the upper end of the central rib $h'$ of the tread $h$, which is gripped between the outer rings $e\ e$, as in the previous case, play being allowed the spokes $k$ in the said holes $l$, as clearly shown. This construction is designed for wheels of heavy vehicles and is employed to give lateral strength to the tire. It will be seen that the ends of the spokes form projections which enter guiding-recesses in the tread, thereby preventing the tread and rim from moving laterally with respect to each other.

Figure 6:
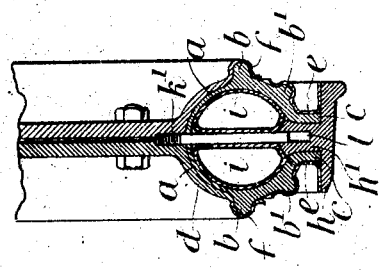

In the modification illustrated in Fig. 6, which shows a wheel designed to run on rails, (projections in this instance,) rods $k'\ k'$ are secured to the rim $d$ and extend down through the tire into guiding recesses or holes $l$ in the central rib $h'$ of the tread $h$ of the wheel, so as to give lateral strength, as in the previous modification. In this case two inner or air chambers $i\ i$ are employed for inflating the tire, which chambers may or may not be connected. The two rings $a\ a$, forming the outer cover, are provided, in addition to the lateral flanges $b\ b$ above described, with lateral flanges $b'\ b'$, entering corresponding grooves or recesses in the two rings $e\ e$, which form the outer casing and by means of which the said outer covering is secured to the tread $h$.

Instead of holes $l$ in the central rib $h'$ of the tread $h$ I may form the said rib $h'$ with a groove, into which the spokes $k$ or rods $k'$ extend.

Fig. 7 shows to a larger scale a tire somewhat similar to that shown in Fig. 4 and illustrates the means which I advantageously employ for securing the tire in the rim. In the said figure pins $a'\ a'$ are shown passed through holes in the lateral grooves or recesses $f\ f$ of the rim $d$ and through the flanges $b\ b$ of the outer covering of the tire, the said pins being all held in position in the holes by means of a wire $a^2$, which passes through holes in the ends of the pins which project through the under side of the lateral grooves or recesses $f\ f$ of the rim, or each pin by a separate split pin or by any other suitable means.

Figs. 8, 9, and 10 show to a larger scale three different forms of pins which can be employed for securing the tire to the rim of the wheel, as above described, though I do not limit myself to the use of these forms. The pins shown in Figs. 9 and 10 do not require a wire to be threaded through them to hold them in position.

For securing the tread $h$ to the tire the means which I advantageously employ are shown in Figs. 11 and 12—that is to say, the two rings $e\ e$, forming the outer casing, grip the said tread between the outer flanges $e\ e$ of the rubber rings $a\ a$ and are held tightly in position by bolts $q\ q$, which are pivoted to one of the rings $e$ and extend through the tread, so that their projecting ends, which are slotted, can be passed over the opposite ring $e$. The washer $r$ is then inserted in the slot, and a screw $s$ is inserted and kept in position by a cap $t$, screwed upon the end of the bolt $q$. These rings may, however, be fixed in position by any other known means.

Fig. 13 illustrates to a larger scale a tire wherein the outer covering $a$ is made somewhat horseshoe-shaped in cross-section. The cover $a$ is in this case shown composed of alternate layers of rubber $a^3$ and of canvas and rubber $a^4$ and is secured to the rim $d$ by split pins $a'\ a'$, passing through their lateral flanges $b\ b$. The tire is provided with an inner tube $i$, and the two flanges $b\ b$ are connected by a strip of canvas $u$, which when the tire is inflated lies against the rim $d$ and serves to protect the inner tube $i$.

Having now particularly described and ascertained the nature of my said invention and in what manner the same is to be performed, I declare that what I claim is—

1. In a vehicle-wheel, the combination with the rim, of a pneumatic cushion surrounding the same, secured to said rim and having separate flanges or edges along its periphery, a tread portion surrounding said cushion, and fastening devices separate from the tread and cushion for positively securing the said tread portion to said edges or flanges, substantially as described.

2. In a vehicle-wheel, the combination with the rim, of a pneumatic cushion surrounding the same, secured to said rim and having separate flanges or edges along its periphery, a tread portion surrounding said cushion, and fastening devices extending transversely through said flanges and a portion of said tread, substantially as described.

3. In a vehicle-wheel, the combination with the rim, of a pneumatic cushion secured to and surrounding the rim, and a tread portion surrounding and secured to said cushion, said rim and tread having, the one, guiding devices, adapted to engage the other to prevent lateral play of the tread and rim with respect to each other, substantially as described.

4. In a vehicle-wheel, the combination with the rim, of a pneumatic cushion secured to and surrounding the rim, and a tread secured to and surrounding said cushion, said rim and tread having the one, projections, engaging recesses in the other, for preventing the lateral movement of said rim and tread with respect to each other, substantially as described.

5. In a wheel the combination of a rim having lateral grooves or recesses, of a pair of india-rubber or other rings having outer peripheral flanges and lateral flanges to enter the said grooves or recesses, of a pair of metal rings forming an outer casing and of a tread having a central rib, which passes up between the outer peripheral flanges and is provided with a groove or holes (or with sockets to receive balls having holes) into which enter the ends of the spokes of the wheel which project from the rim, substantially as described.

6. In a vehicle-wheel, the combination with the rim, of a pneumatic cushion secured to and surrounding the rim, said cushion being open along its periphery forming peripheral flanges or edges, a tread surrounding said cushion and having a portion adapted to enter between said edges or flanges, said rim and the inwardly-extending portion of said tread being provided the one, with projections, and the other with guiding-recesses to receive said projections, to prevent the lateral movement of said rim and tread with respect to each other, substantially as described.

7. In a vehicle-wheel the combination with the rim, of a pneumatic cushion secured to and surrounding said rim, said cushion being open at its periphery forming peripheral flanges or edges, a tread surrounding said cushion and provided with portions adapted to enter between the edges of said cushion and retaining devices passing transversely through said edges of the cushion and the inwardly-extending portion of the tread, substantially as described.

8. In a vehicle-wheel, the combination with the rim having a deep central groove and having its edges provided with lateral annular grooves, of a pneumatic cushion engaging said central groove and provided on each side with an annular rib to engage one of said lateral grooves in said rim, said cushion being open along its periphery and forming peripheral edges, a tread surrounding said cushion and engaging said peripheral edges, fastening devices extending transversely through said edges of the cushion and through said tread, and fastening devices extending transversely through the lateral grooved portions of said rim and through the lateral ribs of the cushion, substantially as described.

FREDERICK RICHARD SIMMS.

Witnesses:
G. F. REDFERN,
JOHN E. BOUSFIELD.